United States Patent [19]

Ignatowski

[11] Patent Number: 5,675,988
[45] Date of Patent: Oct. 14, 1997

[54] JEWELRY ARTICLE ADAPTED FOR EXTENSION FROM EYEGLASSES

[76] Inventor: Patricia M. Ignatowski, 8828 W. Melody La., Greenfield, Wis. 53228

[21] Appl. No.: 637,195

[22] Filed: Apr. 8, 1996

[51] Int. Cl.$^6$ .................................................. A44C 15/00
[52] U.S. Cl. ................................................. 63/38; 351/52
[58] Field of Search .................................... 63/2, 3, 4, 21; 351/51, 52, 156; 24/3 C

[56] References Cited

U.S. PATENT DOCUMENTS

| | | | |
|---|---|---|---|
| D. 313,368 | 1/1991 | Peterson | D11/88 |
| D. 324,871 | 3/1992 | Cordet et al. | D16/103 |
| 2,766,541 | 10/1956 | Quinones et al. | 41/34 |
| 2,960,787 | 11/1960 | Quinones et al. | 41/34 |
| 3,010,365 | 11/1961 | Sadel | 88/52 |
| 4,153,346 | 5/1979 | Gomer | 351/52 |
| 4,471,509 | 9/1984 | Marks | 351/156 X |
| 4,974,955 | 12/1990 | Treadaway | 351/123 |
| 4,974,956 | 12/1990 | Gill | 351/156 |
| 5,024,515 | 6/1991 | Beckemeyer et al. | 351/52 |
| 5,161,234 | 11/1992 | Nitta | 351/52 |
| 5,414,907 | 5/1995 | Kiapos | 24/3.3 |

OTHER PUBLICATIONS

River Gems and Findings Catalog, p. 421.

*Primary Examiner*—Kien T. Nguyen
*Attorney, Agent, or Firm*—Mark W. Pfeiffer

[57] ABSTRACT

A jewelry article is adapted for attachment as an extension of the temple arm on conventional eyeglasses. The jewelery extension, or "glasstension", grips the temple arm with an elastic loop potion of a gripping member, and the gripping member in turn supports one or more elongated strands of jewelry type decorations, such as beads and charms. Each glasstension is a unitary piece, with the elongated decorative strands being securely affixed onto the gripping member.

5 Claims, 1 Drawing Sheet

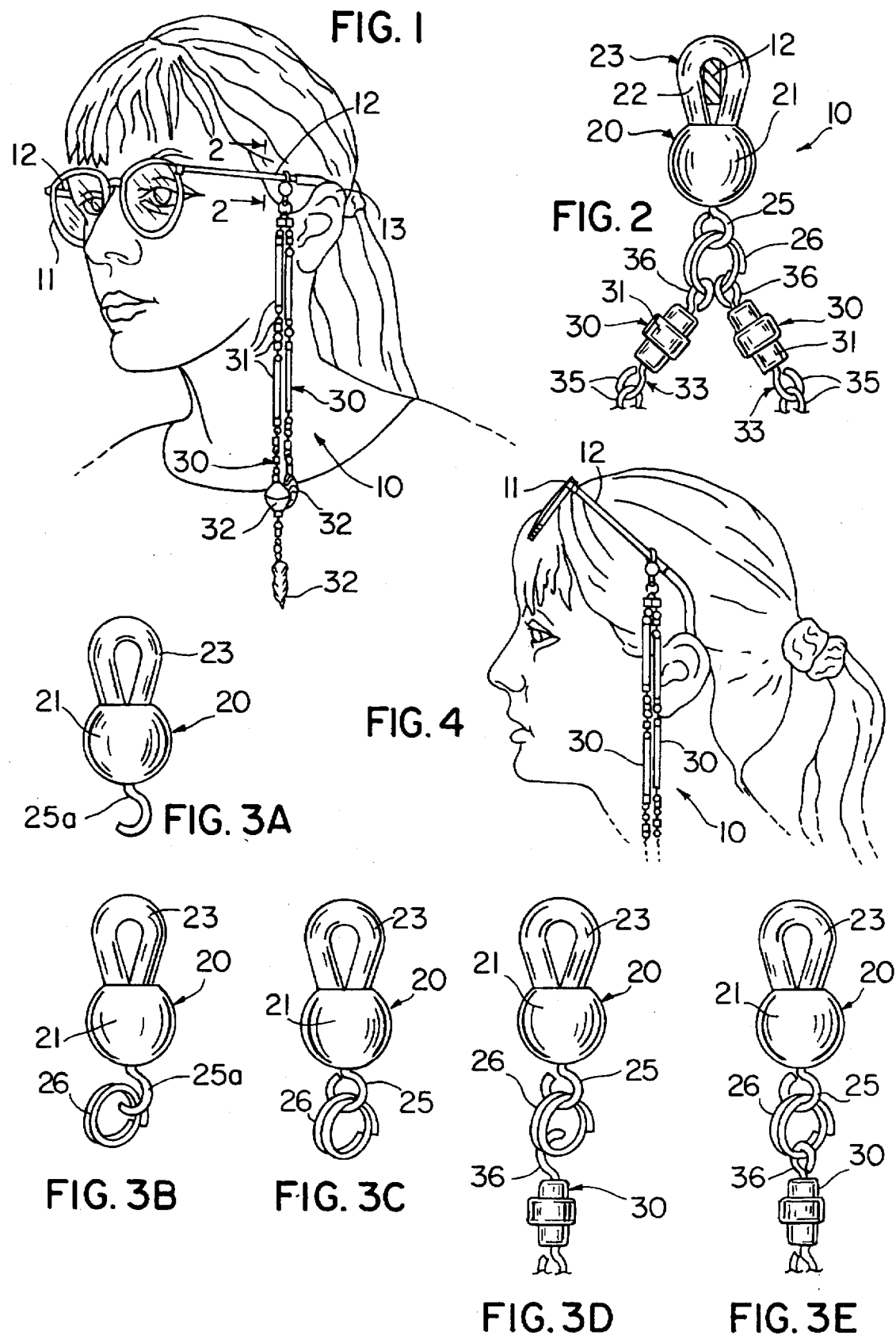

JEWELRY ARTICLE ADAPTED FOR EXTENSION FROM EYEGLASSES

FIELD OF THE INVENTION

The field of the invention is jewelry, more particularly jewelry which is adapted for wearing as attached adornments about the users head.

BACKGROUND OF THE INVENTION

Jewelry articles which are used for adornment are commonly attached on or about the head area of the person using the jewelry. Traditionally, earrings have been a popular jewelry article of this type, and are available in a wide variety of sizes, shapes and styles. However, one factor which influences the design of earring style jewelry is that the size and weight of the jewelry are somewhat limited by the fact that the jewelry is directly attached to the user's earlobe. Even when pierced-ear style attachments are used, earrings which are either too heavy or large in size would both be uncomfortable and be prone to being tugged on when contacting other objects.

Another form of jewelry for use in the head area which has been used is known as "hair-extensions". Hair-extension jewelry usually consists of an elongated decoration, such as a string of beads or other charms, or may even include additional strands of the users own hair. Usually, the wearers hair is braided using a technique known as "corn rowing" to form a tight, thin, braid which is likewise called a "corn row" braid. In order to attach the elongated decoration, the end of the corn row braid is fitted with an attachment point, and the elongated decoration is attached thereto. While hair-extensions are a popular form of jewelry, they are somewhat limited in application, since the user is required to adopt a particular hair style and is required to perform a fairly time consuming preparation. Further, the actual decorative part of the hair-extension may extend well below the head and onto the users shoulders, and thus may not achieve the sought after result when a decoration for the users head is desired.

Thus, the known forms of jewelry for use on or about the users head are each associated with various limiting factors. Further, since jewelry design also includes a component of artistic expression, a need exists for new and imaginative ways utilizing jewelry which overcomes the limitations of prior forms for using such jewelry.

SUMMARY OF THE INVENTION

A jewelry article according to the present invention is particularly adapted for use with a temple arm of an eyeglass frame. The jewelry article includes a gripping member for attachment onto the temple arm, and includes a main body, an elastic loop extending upward from the main body, and an attachment member extending downward from the main body opposite the elastic loop. The elastic loop is adapted to be removably slid onto an open end of the temple arm of the eyeglass frame, where the jewelry article may then be slip to an operative position on the temple arm. The jewelry article includes at least one elongated decorative strand having one end which is securely affixed onto the attachment member of the gripping member in a manner which does not readily facilitate separation of the elongated decorative strand from the gripping member. Consequently, the gripping member and elongated decorative strand form a unitary jewelry article which is removably attachable onto the temple arm as an extension of the eyeglass frame, by virtue of the slidable attachment previously mentioned.

One object of the invention is to provide secure support for relatively long decorative jewelry from an eyeglass frame. Releasable clasps and other attachment mechanisms may be prone to release when long strands are tugged, swung, or subjected to other forces. By using a readily removable and replaceable gripping member, the elongated strands may be affixed thereto in a secure manner, while the entire unit of gripping member and strands together still may be changed at will. For example, the attachment member may formed as a first hook end and an intermediate closed ring, the first hook end depending from the main body of the gripping member and radially encircling the intermediate closed ring. The elongated decorative strand may then include a second hook end which also radially encircles the closed ring. This structure provides the above described secure attachment, particularly when two or more elongated strands are used.

These objects, together with other objects and advantages which will be apparent from the following description, in which reference is made to the accompanying drawings which form a part hereof. The full scope of the invention is not limited to such descriptions, but is set forth in the claims below.

BRIEF DESCRIPTION OF THE DRAWINGS

FIG. 1 is a perspective view showing a jewelry article according to the invention in use;

FIG. 2 is a section view taken on line 2—2 of FIG. 1;

FIGS. 3A–3E are plan views showing a construction sequence for the jewelry article of FIG. 1; and FIG. 4 side elevational view showing the jewelry article of FIG. 1 in an alternative orientation of use.

DESCRIPTION OF THE PREFERRED EMBODIMENT

Referring to FIG. 1, an article of jewelry 10 according to the present invention is adapted for use in conjunction with an eyeglass frame 11 worn by the user. In that regard, the jewelry article 10 has the appearance of being an adjunct to, and an extension of the eyeglass frame 11, and for that reason is referred to herein as a "glasstenstion" 10. As with other jewelry forms, the glasstension 10 is an artistic decoration, which permits adornment of the user in a new and innovative manner. Eyeglasses are usually worn out of necessity, either for correction of visual acuity or for reduction of brightness and glare (i.e. sunglasses), and are normally regarded as being undesirable from an appearance standpoint. However, the glasstension 10 now provides the wearer a new form of personal expression, since the glasstension 10 may be formed with a wide variety of jewelry styles and arrangements within the scope of the invention.

Referring to FIGS. 1 and 2, the eyeglass frame 11 includes temple arms 12 extending from the front of the frame to the top, and possibly around behind the users ear 13, with the temple arms terminating in an open end (not shown). The glasstension jewelry 10 includes a gripping member 20 which is slidably receivable over the open end of the temple arm 12 to be positioned on the temple arm 12 forward of the users ear 13. Because the glasstension jewelry 10 according to the invention is formed as a unitary jewelry item, the glasstension 10 may be used individually on only one temple arm 12 as illustrated in this embodiment, or alternatively may be used in either matched or unmatched pairs on both temple arms 12. Further, the unitary construction of the glasstension 10 also permits attachment of multiple glasstensions 10 in an unbalanced fashion on the temple arms 12. For example, two or three glasstensions 10 may be placed on one temple arm 12, while the other temple arm is left without any. Thus, the wearer is free to express either a symmetrical or asymmetrical appearance by altering the number and order of glasstension jewelry 10 on the temple arms 12.

Again referring to FIGS. 1 and 2, the gripping member 20 includes a main body 21 which cinches the ends of an elastic cord material 22 to form an elastic loop 23 extending upwardly from the main body 21. The gripping member 20 also includes a small loop 25 which is preferrably formed of a malleable metal extending downwardly from the main body 21. The loop 25 radially encircles an intermediate closed ring 26, so that the loop 25 and the intermediate closed ring 26 together form an attachment member for securely attaching one or more elongated decorative strands 30 which form the visually attractive part of the glasstension jewelry 10. Alternatively, the attaching member may be formed as a second downwardly depending elastic loop, although the preferred structure is the aforementioned combination of loop 25 and ring 26. Gripping members 20 of this general type have been known to be used in pairs to form retaining necklaces for eyeglasses 11, and are adaptable for use in this invention as described in detail below. For example, so called "eyeglass holders" suitable for use as the gripping members 20 in this invention are available from River Gems and Findings of Albuquerque, N.Mex. The intermediate closed ring 26 may be formed as a solid torus of metal or other suitable material, or may alternately be formed as a so called "double ring", where a metallic wire is wrapped twice around in a circle. In the preferred form, small jeweler's double rings may be used, such as those available from Darice inc., of Strongsville, Ohio.

Still referring to FIGS. 1 and 2, the elongated decorative strands 30 may be formed in a wide variety of known jewelry styles. In the illustrated embodiment, two elongated decorative strands 30 are shown, each of which is formed as a combination of beads 31 and assorted charms 32 strong together by interlinked jewelry wire 33. The jewelry wire 33 passes through hollow centers of the beads 31 and charms 32 along the length of the elongated decorative strands 30. Links between adjacent sections of the jewelry wire 33 are formed by bending the ends of the jewelry wire to form interlocking loops 35. Likewise, each elongated decorative strands 30 is preferrably connected to the intermediate closed ring 26 by bending the topmost end of the jewelry wire radially around the intermediate closed ring 26 to form a terminal loop 36. The other end of each elongated decorative strand 30 may, for example, be terminated with one of the charms 32, also attached by forming a loop in the jewelry wire 33 around a corresponding loop (not shown) on the desired charm 32.

With the connections as described above, note that the elongated decorative strands 30 are securely affixed onto the intermediate closed ring 26. While some types of releasable jewelry clasps are known, such clasps are usually small and frail, and would thus be prone to failure given the weight and tugging forces that the elongated decorative strands 30 may be subjected to. It is contemplated by the invention to form the elongated decorative strands 30 having a length of approximately nine inches in the preferred embodiment, which may be varied from shorter lengths of from three to four inches, up to very long strands on one foot or more. The invention is particularly adapted for supporting long strands of this type. Furthermore, releasability between the elongated decorative strands 30 and the gripping member 20 is not required in this invention, since the entire combination of the gripping member 20 and the securely attached elongated decorative strands 30 forms a unitary jewelry item which is designed to be changed only as a unit, e.g. by being slid on and off of the temple arm 12 of the eyeglass frame 11.

Referring now to FIGS. 3A–3E, the preferred construction of the glasstension 10 can now be described. As mentioned above, a preferred form for the gripping member 20 is a prefabricated eyeglass holder, which is manufactured with a closed eye-loop 25 depending from the main body 21. This closed eye-loop 25 may be pryed open with a small flat nosed jeweler's pliers to present an open loop 25a as shown in FIG. 3A. Then the intermediate closed ring 26 (such as the above mentioned commercially available "double ring" as illustrated) is placed over the open loop 25a as shown in FIG. 3B, and the loop may then be bent back to the closed position as shown in FIG. 3C. In a similar manner, the topmost link 36 of each elongated decorative strand 30 is first opened and placed over the intermediate closed ring 26 as shown in FIG. 3D, and then closed to complete the attachment as shown in FIG. 3E.

Referring to FIG. 4, people who wear eyeglasses sometimes desire to move the eyeglasses from the operative position directly in from of their eyes, to a holding position where the front of the eyeglass frame 11 rests atop of the wearers head. This is a common expedient, particularly when sunglasses or "reading only" eyeglasses are used. This popular use of eyeglasses is not only readily accommodated, but in fact the glasstension 10 according to the present invention continues to provide an adorning quality even though the eyeglasses 11 have been moved to a non-operative position. In particular, since the joint between the gripping member 20 and the elongated decorative strands 30 is free to swivel, the elongated decorative strands 30 will still be drawn under gravity to an approximately vertical orientation. The elongated decorative strands 30 will also still be approximately in the same general area of the wearer's head, and thus continue to provide the desired accentuating effect.

There has been described above a preferred form of the invention. Modifications to this preferred embodiment may be apparent to those skilled in the art which are within the scope of the invention.

I claim:

1. An article of jewelry adapted for use with a single temple arm of an eyeglass frame, the article of jewelry comprising:

a single gripping member which includes a main body, an elastic loop extending upward from the main body, and an attachment member extending downward from the main body opposite the elastic loop, the elastic loop being adapted to be removably slid onto an open end of the temple arm of the eyeglass frame;

at least one elongated decorative strand having a first end which is securely affixed onto the attachment member of the gripping member in a secure, unreleasible manner which does not provide for manual separation of the elongated decorative strand from the gripping member, and a second end which is free hanging under the gravity from the gripping member, wherein the gripping member and elongated decorative strand from a unitary jewelry article which is removably attachable onto said single temple arm so as to depend therefrom as a single sided extension of the eyeglass frame.

2. The article of jewelry as recited in claim 1 in which the attachment member comprises a first hook end and an intermediate closed ring, the first hook end depending from the main body of the gripping member and radially encircling the intermediate closed ring, and in which the elongated decorative strand includes a second hook end which also radially encircles the closed ring.

3. The article of jewelry as recited in claim 2 in which at least two elongated decorative strands are securely affixed onto the intermediate closed ring.

4. The article of jewelry as recited in claim 3 in which each elongated decorative strand comprises a plurality of decorative jewelry articles strong together on jewelry rods.

5. The article of jewelry as recited in claim 3 in which more than two elongated decorative strands are securely affixed onto the intermediate closed ring.

* * * * *